United States Patent
Goel et al.

(10) Patent No.: US 8,001,464 B1
(45) Date of Patent: Aug. 16, 2011

(54) SEGMENTATION OF MARKUP LANGUAGE DOCUMENTS

(75) Inventors: Navin Goel, Torrance, CA (US); William D. Compton, Huntington Beach, CA (US); Steven R. Evans, Torrance, CA (US); Randall Ehler, Culver City, CA (US)

(73) Assignee: Glovia International, Inc., El Segundo, CA (US)

( * ) Notice: Subject to any disclaimer, the term of this patent is extended or adjusted under 35 U.S.C. 154(b) by 1765 days.

(21) Appl. No.: 10/977,092

(22) Filed: Oct. 29, 2004

(51) Int. Cl.
*G06F 17/00* (2006.01)
*G06F 15/16* (2006.01)

(52) U.S. Cl. ......... 715/234; 709/219; 709/246; 709/206
(58) Field of Classification Search .................. 715/500, 715/513, 515
See application file for complete search history.

(56) References Cited

U.S. PATENT DOCUMENTS

| | | | |
|---|---|---|---|
| 5,630,070 A | 5/1997 | Dietrich et al. | 705/8 |
| 6,141,647 A | 10/2000 | Meijer et al. | 705/1 |
| 6,360,252 B1 * | 3/2002 | Rudy et al. | 709/206 |
| 6,615,092 B2 | 9/2003 | Bickley et al. | 700/99 |
| 6,629,008 B2 | 9/2003 | Shiiba et al. | 700/100 |
| 6,915,275 B2 | 7/2005 | Banerjee et al. | 705/26 |
| 6,934,594 B2 | 8/2005 | Loring et al. | 700/100 |
| 7,117,210 B2 * | 10/2006 | DeSalvo | 707/10 |
| 2001/0032254 A1 * | 10/2001 | Hawkins | 709/219 |
| 2003/0050933 A1 * | 3/2003 | DeSalvo | 707/102 |
| 2003/0093565 A1 * | 5/2003 | Berger et al. | 709/246 |
| 2004/0117048 A1 | 6/2004 | Wei | 700/100 |
| 2004/0117227 A1 | 6/2004 | Wei | 705/7 |
| 2004/0148212 A1 | 7/2004 | Wu et al. | 705/8 |

OTHER PUBLICATIONS

Wacker, J.G., Lummus, R.R., "Sales Forecasting for Strategic Resource Planning," International Journal of Operations & Production Management 22, 9/10 (2002) 1014-1031.

* cited by examiner

*Primary Examiner* — Cesar B Paula
*Assistant Examiner* — Nathan Hillery
(74) *Attorney, Agent, or Firm* — Baker Botts L.L.P.

(57) ABSTRACT

A communication system includes a number of devices interconnected by a communication network and each operable to communicate with each other using a text-based communication protocol that provides for the exchange of markup language documents. Each of the devices is further capable of segmenting large communications into multiple document segments for communication to other devices. The devices are further capable of reassembling received document segments into original documents.

25 Claims, 3 Drawing Sheets

SEGMENTATION OF MARKUP LANGUAGE DOCUMENTS

TECHNICAL FIELD OF THE INVENTION

The present invention relates generally to segmentation of text documents and, more particularly, to segmentation of markup language documents used for communications.

BACKGROUND OF THE INVENTION

The introduction of the World-Wide-Web gave rise to the popularity of text-based communication formats, such as hypertext markup languages (HTML). A number of other markup languages have evolved to provide even greater functionality than was originally provided by HTML. For example, extensible markup language (XML) provides a generic framework for sophisticated text-based communications. With the rapid spread of these text-based communication protocols, additional technological challenges must constantly be identified and overcome.

SUMMARY OF THE INVENTION

In accordance with the present invention, techniques for segmentation of markup language documents are provided.

According to a particular embodiment, a method for parsing data for delivery to a remote device identifies an original markup language document including text-based electronic data for delivery to a destination address, the electronic data having a plurality of subparts identifiable based upon properties of the electronic data. The method parses the data into the subparts and generates a master markup language document including a master identifier, an indication of the number of the subparts, and the destination address. The method further generates, for each of the subparts, a markup language document segment including a segment identifier, the master identifier, a sequence number, and the subpart. The method also transmits the master document and each of the document segments using a communication network.

Embodiments of the invention provide various technical advantages. These techniques can provide for segmentation of large documents into two or more smaller documents. This can provide for more efficient transport of these documents and may also enable transport of large documents across networks with limited capabilities. Also, according to particular embodiments, specialized markup language interfaces may operate on communicating devices to provide for segmentation and reassembly of segmented documents. These specialized interfaces can thus provide segmentation functionality without impacting other applications and elements within a system. That is, other applications and elements need not have an awareness of the segmentation and reassembly of documents.

As noted, the document interfaces may thus provide for segmentation and reassembly of documents to overcome network limitations. For example, an intermediate component between two communicating devices may have an inherent limit on the size of documents that it can transport. In these circumstances, markup language document interfaces at each of the communicating devices can provide for segmentation and reassembly of communicated documents such that no single document processed by the intermediate device exceeds its limitations. The interfaces may further perform the segmentation and reassembly such that higher level applications and intermediate communicating devices are unaware of the segmentation and reassembly procedures.

To provide for transparent segmentation and reassembly of documents, interfaces may ensure that each document segment conforms to appropriate standards. For example, when communicating large XML documents, an interface may segment the document into a number of document segments that each conform to XML standards or other requirements for valid documents.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
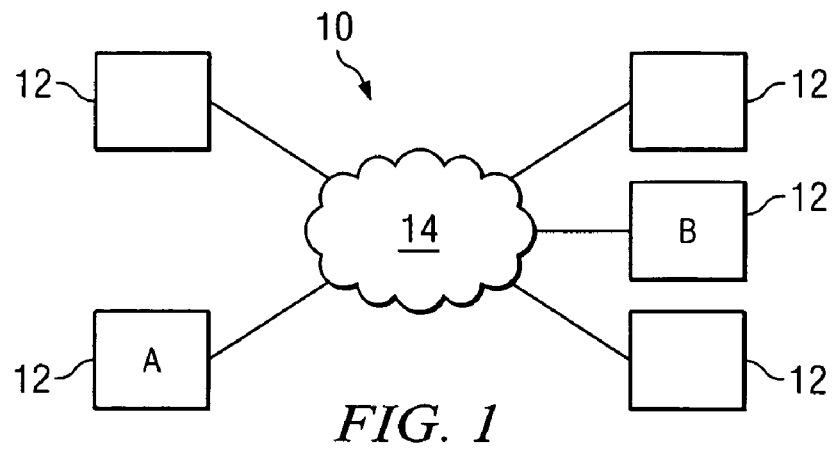
FIG. 1 is a system that includes a network interconnecting a number of devices each operable to segment and reassemble markup language documents.

FIG. 1 illustrates a communication system, indicated generally at 10, that includes a number of devices 12 interconnected by a communications network 14. Applications operating on devices 12 communicate with each other using text-based communication protocols that provide for the exchange of documents. Interfaces on devices 12 may provide for the segmentation and reassembly of these documents. Network 14 provides for transport of documents and document segments between communicating devices 12.

Network 14 represents any suitable collection and arrangement of components capable of interconnecting devices 12. For example, network 14 may encompass some or all of networks such as the Internet, the public switched telephone network (PSTN), and private networks. In some instances, selected elements within network 14 may restrict the size of transported documents. These restrictions may result from configurations or inherent limitations of selected elements within network 14. For example, memory capabilities of selected elements of network 14 may restrict the maximum size of documents communicated between devices 12.

Devices 12 represent hardware, including appropriate controlling logic, capable of processing information and interacting with other devices 12 using text-based communications. For example, devices 12 may represent one or more elements of a distributed enterprise system that perform business functions at various locations. Applications on devices 12 interact with each other by exchanging documents containing text-based communications. These documents may conform to any public or private standards designed for text-based communications. For example, these documents may be markup language documents conforming to HTML, XML or other suitable public or private standards. Thus markup language documents should be understood to encompass any suitable text-based communication conforming to a public or private communication protocol. To provide for robust transport of communications across network 14, devices 12 may support segmentation and reassembly of large documents. For example, consider device 12 labeled A (device A) having a document for delivery to device 12 labeled B (device B). Based upon configurations or other suitable information, device A may determine that segmentation of the document is appropriate. In response, device A may segment the document into a number of document segments and transmit each of the document segments to device B across network 14. Upon receipt of all of the document segments, device B may reassemble the original document and then process the document using an appropriate application.

According to particular embodiments, devices 12 segment documents by creating a master document in addition to two or more document segments. The document segments each include portions of data from the original document, and the master document includes information for identifying and reassembling the document segments into the original document. However, the distinction between master document and document segments is provided merely as an example operation, and system 10 contemplates any suitable techniques for delivering information regarding the segmentation within master documents or document segments.

To facilitate transport of segmented documents across network 14, device 12 may generate each segment as a conforming document. For example, if creating documents based upon the XML standard, device 12 may ensure that each document segment and master document comport with requirements of the XML standard. This can help ensure successful transport of each document segment and master document across network 14.

Devices 12 may use any suitable techniques for determining when segmentation of documents is appropriate. For example, because of the potentially unknown nature of elements within network 14, devices 12 may be configured to segment documents into relatively small document segments. As an alternative, devices 12 may operate to automatically detect limitations inherent in network 14 and may use these detected limitations to guide segmentation of documents. As yet another alternative, devices 12 may be configured to segment particular types of documents or particular data contained within documents. However system 10 contemplates devices 12 using any suitable combination of configurations, automated discovery procedures, and other techniques to determine appropriate times to segment documents.

Devices 12 also provide for reassembly of segmented documents upon receipt. To support reassembly, devices 12 operate to identify and store master documents and document segments until all associated documents are received. Upon receiving a complete set of documents, device 12 may use the information from the document segments and the master document to assemble the original document. Once assembled, device 12 may process the original document using an appropriate application.

It should be understood that while system 10 illustrates a relatively simple configuration of devices 12 interconnected by network 14, system 10 is provided merely for illustrative purposes. Thus the disclosed concepts should be understood to encompass any suitable collection and arrangement of components in which endpoints use document segmentation and reassembly in a manner similar to that described herein.

Figure 2:
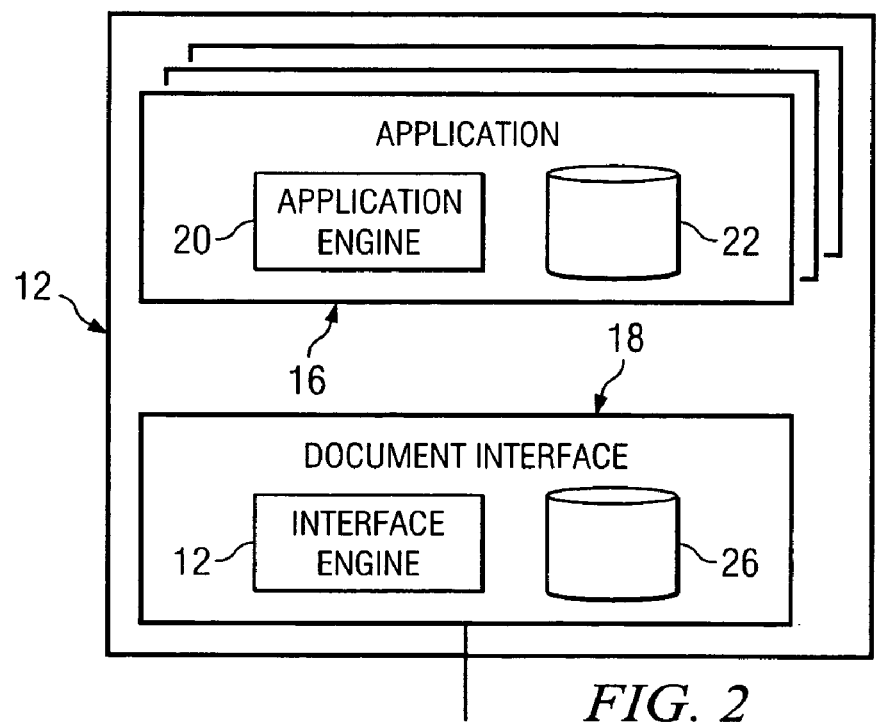
FIG. 2 is a block diagram illustrating exemplary functional elements for a device from the system.

FIG. 2 is a block diagram illustrating exemplary functional elements for a device 12 that includes one or more applications 16 and a document interface 18. Applications 16 provide processing and other high level functionality, and further support communications with other applications and devices 12 using document-based communications. Document interface 18 provides for transport of documents communicated between devices 12. Document interface 18 further provides for segmentation and reassembly of documents.

Each application 16 includes software or other logic capable of generating documents for transmission and for processing received documents. For example, application 16 may be a business application for handling enterprise resource planning activities for a managed facility, with the application capable of communicating with other business applications using text-based document communications. In the embodiment illustrated, application 16 includes an application engine 20, for performing processing functions, and an application database 22, for maintaining data for use by application 16. For example, application database 16 may maintain application logic and business data, such as a product catalog, for an organization.

Document interface 18 represents software or other logic for handling transmission and receipt of documents. Document interface 18 supports segmentation of outbound documents and reassembly of segmented inbound documents. In the embodiment illustrated, document interface 18 includes an interface engine 24, for performing processing functions, and an interface database 26, for maintaining data used by document interface 18. According to particular embodiments, interface database 26 stores configurations for segmentation of documents, such as thresholds, message types, and instructions for parsing particular message types. For example, interface database 26 may maintain a list of message types and, for each type, provide instructions for parsing data within the message and settings for controlling the parsing into segments. As a specific example, consider a product catalog message type. For this message type, interface database 26 may indicate particular instructions for parsing the product catalog data into separate sections of data, with each section including "complete" information from a communication protocol standpoint. In addition, interface database 26 may provide a buffer for storage of document segments until the segments may be reassembled into an original document for communication to one of application 16.

As noted, applications 16 communicate during operation with remote applications using markup language documents. Thus one or more of applications 16 may generate documents for delivery to remote devices 12. Applications 16 may provide these documents to document interface 18 for transmission. Upon receipt of a document from application 16, document interface 18 may determine whether or not to segment the document. For example, based on thresholds, message type, or other configurations within interface database 26, document interface 18 may determine to parse the original document into document segments.

To segment the original document, document interface 18 parses data contained within the original document into a number of sections and generates document segments containing each of these sections of the original data. As previously mentioned, document interface 18 may parse the data such that each data section remains in conformance with the protocol used for communications. For example, if communicating using XML documents, document interface 18 may parse the data and form document segments using the parsed data such that each document segment conforms to XML requirements. In addition to forming two or more document segments, document interface 18 may also generate a master document associated with the document segments. According to particular embodiments, the master document can alert a remote destination device 12 to the existence of a parsed original document and give the remote device 12 information for reassembling received document segments. For example, a master document may include a master document identifier referenced by each of the document segments. As an alternative to a separate master document, document interface 18 may insert similar master information into one of the document segments containing parsed data from the original document. A particular example of the parsing of an original document into a master document and a number of document segments is provided below with respect to FIG. 3.

Document interface 18 further provides for reassembly of segmented documents received from other devices 12. To enable the assemble of document segments, document interface 18 may monitor incoming documents to identify document segments and master documents. For example, document interface 18 may examine particular fields within received documents to determine whether these documents require reassembly. Document interface 18 may use interface database 26 to temporarily store document segments and master documents until all associated documents are received. Upon receiving all associated documents, document interface 18 may reassemble the original document from the document segments and master document. After reassembly, document interface 18 may then communicate the reassembled document to the appropriate application 16.

While the embodiment illustrated and the preceding description focus on a particular embodiment of device 12 that includes specific logical elements, system 10 contemplates devices 12 having any suitable combination and arrangement of elements that support communications using text-based documents that may be segmented and reassembled within device 12. Therefore, the modules and functionalities described may be separated or combined as appropriate, and some or all of the functionalities of device 12 may be performed by logic encoded in media, such as software and/or programmed logic devices. Furthermore, it should be noted that the embodiment illustrated and preceding description focus primarily on lower level transport functions without specifying in detail the higher level application functions provided by device 12. However, system 10 contemplates using the disclosed transport mechanisms to support any appropriate applications operating within devices 12.

Figure 3:
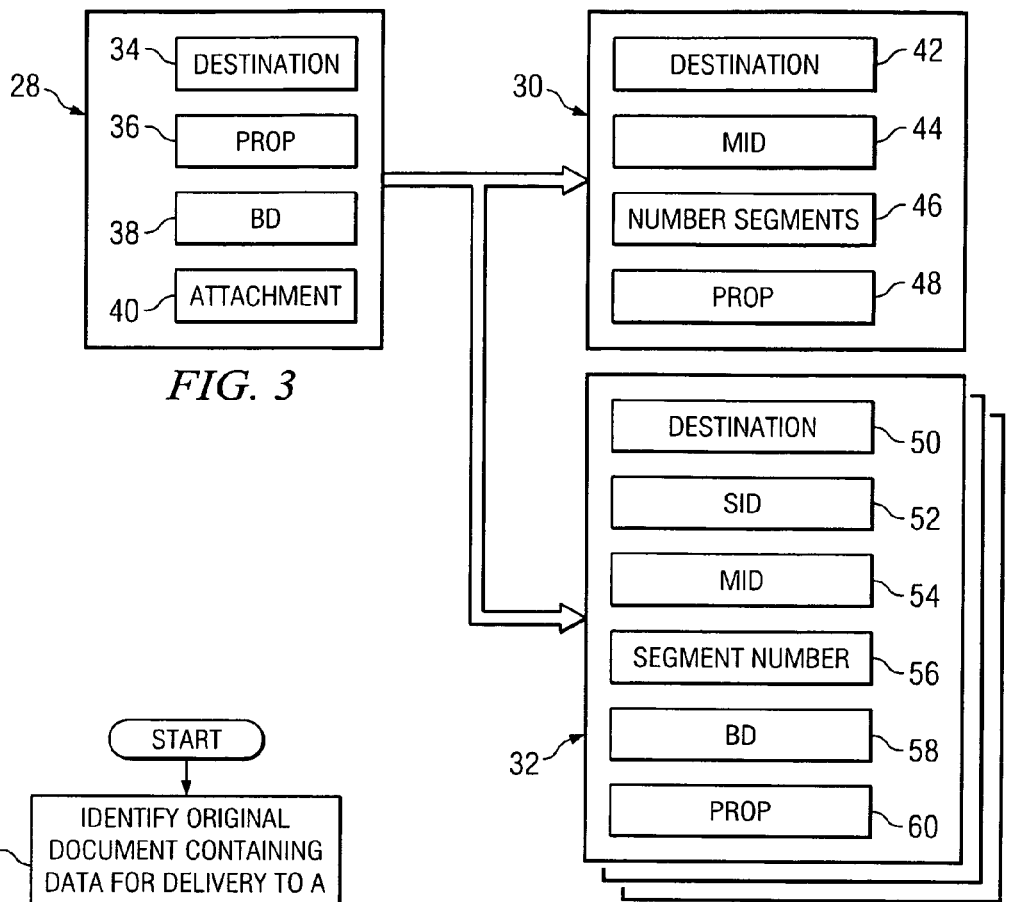
FIG. 3 is a block diagram illustrating segmentation of an exemplary markup language document into a master document and a number of document segments.

FIG. 3 is a block diagram illustrating an example parsing of an original document 28 into a master document 30 and a number of document segments 32. Thus FIG. 3 provides an example of segmentation of original document 28 that may be performed by document interface 18.

In the embodiment illustrated, original document 28 includes information including a destination address 34, properties 36, business data 38, and attachments 40. Destination address 34 identifies the intended target for original document 28. For example, destination address 34 may include a network address for a remote device 12 and/or information identifying a target application on a remote device 12. Properties 36 include information for interpreting document 28, such as information required by the standard used for communicating original document 28. Business data 38 includes the data for transport within original document 28. For example, business data 38 may include sales orders, product catalogs, manufacturing information, or other suitable data. Attachments 40 may include any number of files attached to original document 28. For example, attachments 40 may binary data files such as postscript data files, word documents, spreadsheets, or other suitable attachments. Moreover, while original document 28 is illustrated as including attachments 40, it should be understood that original document 28 may include none or some attachments 40.

As indicated by the illustration, device 12 may parse original document 28 into master document 30 and a number of document segments 32. In the embodiment illustrated, master document 30 includes information including a destination address 42, a master identifier 44, a number of segments identifier 46, and properties 48. To permit delivery of master document 30 to the appropriate remote device 12, destination address 42 will typically match destination address 34 within original document 28. Similarly, properties 48 may match some or all of properties 36 as identified within original document 28. Master identifier 44 represents a message number or other suitable identifying information for master document 30. For example, master identifier 44 may be a document number assigned to master document 30. Number of segments indicator 46 specifies the number of document segments 32 associated with master document 30.

In the embodiment illustrated, document segments 32 each include a destination address 50, a segment identifier 52, a master identifier 54, a segment number 56, business data 58, and properties 60. While not explicitly illustrated, attachments 40 may be included within master document 30 and/or one or more document segments 32. As with master document 30, destination address 50 and properties 60 may match to destination address 34 and properties 36 of original document 28. Segment identifier 52 represents a message number or other suitable identifier for each document segment 32. Thus each document segment 32 may have a segment identifier 52 unique to that document segment 32. Master identifier 54 includes information identifying master document 30 associated with document segment 32. Thus in the example illustrated, master identifier 54 within document segment 32 will match master identifier 44 within master document 30. Segment number 56 includes sequencing information for reassembling document segments at the receiving device 12. Thus each document segment 32 may include a segment number unique among the associated document segments 32. Business data 58 includes a subset of information from business data 38 within original document 28. As previously discussed, business data 58 may contain a complete set of data from a communication protocol standpoint. This permits each document segment 32 to conform to communication protocol standards.

For example, consider original document 28 including business data 38 that specifies an entire product catalog for an organization. The product catalog may be formed by any number of separate products that can each stand alone as separate document information. Configuration data within interface database 26 may identify this type of message type and specify a particular technique for parsing the product catalog into data sections. This represents an example of "property based" segmentation of an original document. Property based segmentation can provide for parsing of a document based upon properties of data within the document. The resulting document segments may thus each encode smaller chunks of data from the original document without requiring device 12 to segment documents based purely upon size of data segments. Thus while size may be a limiting factor for document segment 32, the segmentation of an original document into document segments 32 may take place based upon a message type and/or properties of business data 38 contained within original document 28 without regard to the size determinations. This property based segmentation provides one technique for ensuring completeness of each document segment. As alternative, device 12 may provide for automated discovery of complete segments of data within original document 28. Thus device 12 uses configurations and/or automated techniques for discovering complete data sections to ensure that each data segment 32 includes complete business data 58.

While the embodiments illustrated and the preceding description of documents focus on particular examples that include specific data elements, system 10 contemplates devices 12 operating on original documents 28 that include any suitable information and generating document segments 32 and/or master documents 30 that also include any appropriate information. For example, the particular data contained within each of these documents may be tailored as appropriate for various communications protocols.

Figure 4:
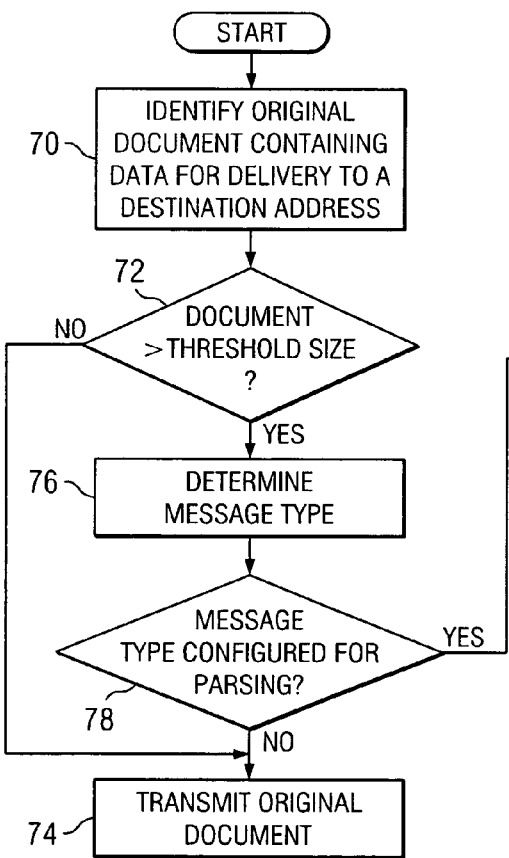
FIG. 4 is a flowchart illustrating an exemplary method for segmenting a document into a master document in a number of document segments.
Figure 4:
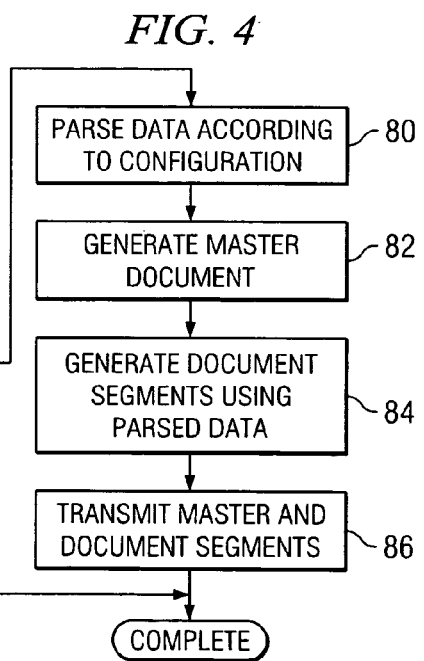

FIG. 4 is a flowchart illustrating a method for parsing an original document into a master document and one or more document segments. While the following description focuses on the operation of document interface 18, it should be understood that similar techniques may be performed by any suitable elements to provide for the segmentation of documents. Document interface 18 identifies an original document containing data for delivery to a destination address at step 70. For example, document interface 18 may receive an XML document from one of applications 16 operating on device 12. Document interface 18 determines whether the document exceeds a threshold size at step 72. For example, document interface 18 may access interface database 26 to determine a threshold size over which documents should be segmented, and may then compare the size of the original document with the threshold to determine whether or not segmentation is appropriate. If not, document interface 18 may transmit the original document at step 74. However, if document segmentation is appropriate, document interface 18 may determine a data type for the document at step 76. For example, device 12 may access properties of the original document, the business data within the original document, or other suitable information to determine properties of the document, such as the type of data contained within the document. Using this information, device 12 determines whether the data type is configured for parsing at step 78. For example, document interface 18 may access interface database 26 to determine whether or not the message type has been configured for segmentation. If not, document interface 18 may transmit the original document at step 74.

If the document exceeds the threshold and the message type is configured for segmentation, document interface 18 may segment the data from the original document according to the configuration. For example, as previously discussed, for a product catalog message type, individual products may be parsed from the complete product catalog and formed into separate document segments. Document interface 18 generates a master document at step 82. To generate the master document, document interface 18 may use information from the parsing of data at step 80. For example, based upon the number of data sections generated during parsing, device 12 may specify fields within the master document indicating the number of document segments to be created. Document interface 18 generates document segments using the parsed data at step 84. For example, document interface 18 may generate a separate document segment 32 for each parsed section of the data from the original document. After generating the master document and document segments, document interface 18 transmits these documents at step 86.

Thus the preceding flowchart illustrates an exemplary method for parsing an original document into a master document in one or more document segments. However, this flowchart illustrates only an exemplary method of operation, and system 10 contemplates document interface 18 using any suitable techniques, elements, and applications for performing similar segmentation of documents. Thus, many of the steps in this flowchart may take place simultaneously and/or in different orders than as shown. In addition, document interface 18 may use methods with additional steps, fewer steps, and/or different steps, so long as the methods remain appropriate.

Figure 5:
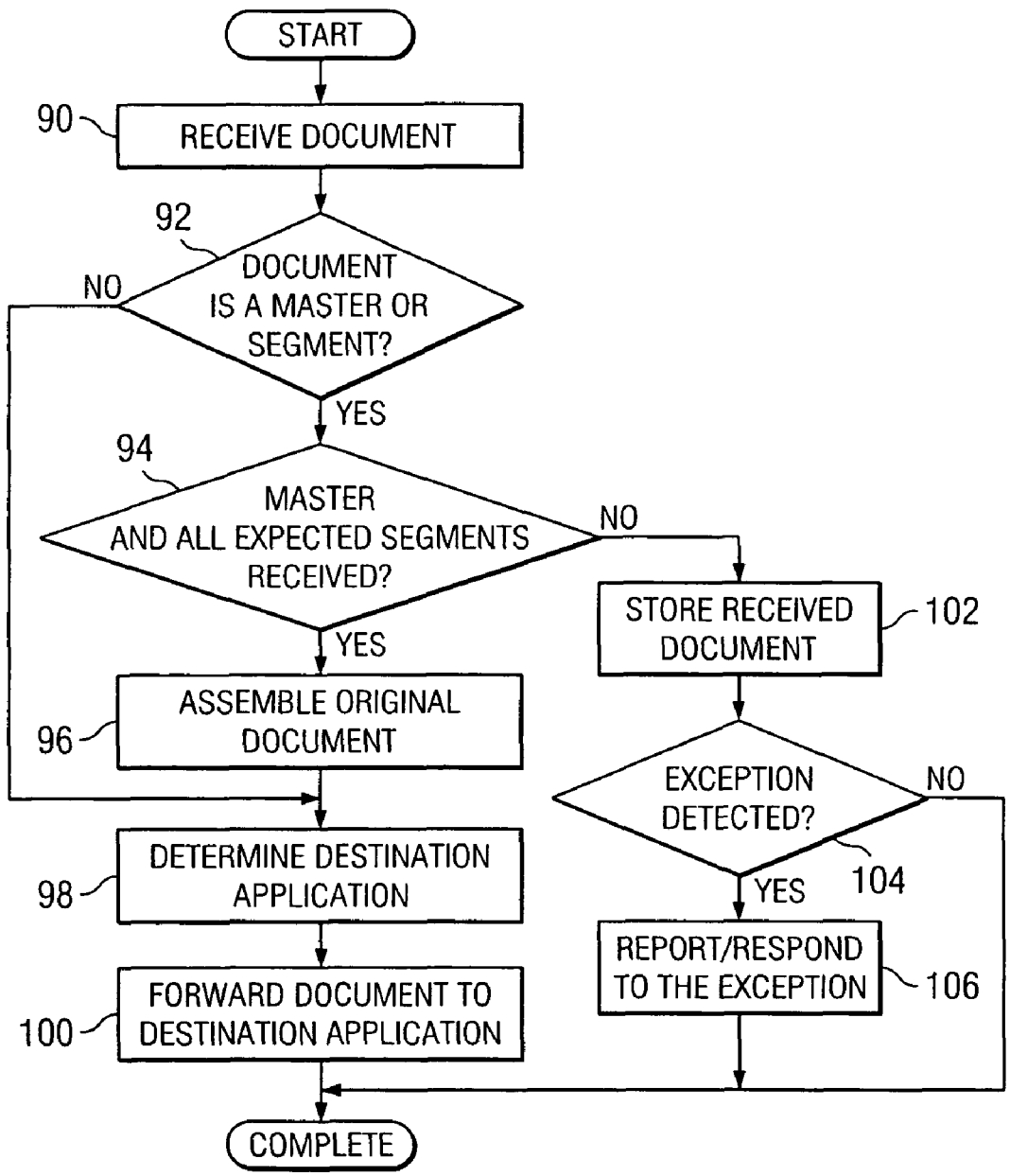
FIG. 5 is a flowchart illustrating an exemplary method for reassembling a segmented document.

FIG. 5 is a flowchart illustrating a method for reassembling a segmented document into its original form. The following description focuses on the operation of document interface 18 in performing this function, however, as with the preceding flowchart, it should be understood that any suitable elements within system 10 may perform similar functions. Document interface 18 receives a document at step 90. For example, document interface 18 may receive a document transmitted from a remote device 12 across network 14. Document interface 18 determines whether the document is a master document or a document segment at step 92. In this step, document interface 18 differentiates between unsegmented documents and documents associated with a segmented document. If the document is an unsegmented document, document interface 18 determines a destination application for the document at step 98 and forwards the document to the destination application at step 100.

However, if the document is a master document or document segment, document interface 18 determines whether the master document and all associated segments for the master document have been received at step 94. If so, document interface 18 may now reassemble the original document from its document segments at step 96. Document interface 18 then determines the destination application for the assembled document at step 98 and forwards the assembled document to the destination application at step 100.

At step 94, if document interface 18 receives a master document or document segment but determines that not all associated documents have been received, document interface 18 may store the received document at step 102. For example, document interface 18 may store the received document within interface database 26. Document interface 18 may then determine whether an exception has been detected at step 104. For example, document interface 18 may determine whether a timeout for receiving all associated documents has been exceeded. If an exception has been detected, document interface 18 may report and/or respond to the exception at step 106. For example, upon detecting that a maximum time for receiving all associated documents has been exceeded, document interface 18 may delete the stored segments and/or report the exception to an administrator or to the device 12 attempting to transmit the document.

Thus the preceding flowchart illustrates a method for reassembling document segments into an original document at a receiving document interface 18. However, as with the previous flowchart, this flowchart illustrates only an exemplary method of operation, and system 10 contemplates document interface 18 using any suitable techniques, elements, and applications for performing similar reassembly techniques. Thus, many of the steps in this flowchart may take place simultaneously and/or in different orders than as shown. In addition, document interface 18 may use methods with additional steps, fewer steps, and/or different steps, so long as the methods remain appropriate.

Although the present invention has been described in several embodiments, a myriad of changes and modifications may be suggested to one skilled in the art. It is intended that the present invention encompass such changes and modifications as fall within the scope of the present appended claims.

What is claimed is:

1. A method for parsing data for delivery to a remote device comprising:
identifying an original markup language document comprising text-based electronic data for delivery to a destination address, the electronic data having a plurality of subparts identifiable based upon properties of the electronic data;
parsing the data into the subparts;
generating a master markup language document comprising a master identifier, an indication of the number of the subparts, and the destination address;
generating, for each of the subparts, a markup language document segment comprising a segment identifier, the master identifier, a sequence number, and the subpart; and
transmitting the master document and each of the document segments using a communication network.

2. The method of claim 1, further comprising:
receiving a second master document comprising a second master document identifier;
receiving a plurality of second document segments each comprising a segment identifier, the second master identifier, a sequence number, and a subpart of second text-based electronic data;
associating the second master document and the second document segments using the second master identifier;
determining that all expected ones of the second document segments have been received; and
assembling a second original document from the subparts contained in the second document segments.

3. The method of claim 2, further comprising:
determining a destination application based on the destination address indicated in the original markup language document; and
delivering the original markup language document to the destination application.

4. The method of claim 1, wherein the original markup language document further comprises a binary file attachment, and wherein the method further comprises identifying the binary file attachment and attaching the binary file attachment to a selected one of the master markup language document, one of the document segments, or an additional document segment.

5. The method of claim 1, wherein the master markup language document and all of the document segments conform to a public standard for text-based, markup language communications.

6. The method of claim 5, wherein the standard is an extensible mark-up language (XML) standard.

7. The method of claim 1, further comprising:
determining a message type for the original markup language document;
accessing an interface database specifying, for the message type, the properties for identifying the subparts of the electronic data in the original markup language document; and
using the properties indicated in the interface database to perform the parsing of the electronic data.

8. The method of claim 1, further comprising:
determining a segmentation threshold;
determining a size of the original markup language document;
determining that the size exceeds the threshold; and
performing the generation of the master markup language document and the document segments in response to determining that the size exceeds the threshold.

9. A processing device capable of text-based communications comprising:
an application operable to generate an original markup language document comprising text-based electronic data for delivery to a destination address, the electronic data having a plurality of subparts identifiable based upon properties of the electronic data;
a document interface coupled to the application and to a communication network, the document interface operable to parse the data into the subparts, to generate a master markup language document comprising a master identifier, an indication of the number of the subparts, and the destination address, to generate, for each of the subparts, a markup language document segment comprising a segment identifier, the master identifier, a sequence number, and the subpart, and to transmit the master document and each of the document segments using the communication network.

10. The device of claim 9, wherein the document interface is further operable to:
receive a second master document comprising a second master document identifier;
receive a plurality of second document segments each comprising a segment identifier, the second master identifier, a sequence number, and a subpart of second text-based electronic data;
associate the second master document and the second document segments using the second master identifier;
determine that all expected ones of the second document segments have been received; and
assemble a second original document from the subparts contained in the second document segments.

11. The device of claim 10, wherein the document interface is further operable to:
identify the application based on a second destination address indicated in the second original document; and
deliver the second original document to the application.

12. The device of claim 9, wherein the original document further comprises a binary file attachment, and wherein the document interface is further operable to identify the binary file attachment and attach the binary file attachment to a selected one of the master document, one of the document segments, or an additional document segment.

13. The device of claim 9, wherein the master document and all of the document segments conform to a public standard for text-based, markup language communications.

14. The device of claim 13, wherein the standard is an extensible mark-up language (XML) standard.

15. The device of claim 9, further comprising:
an interface database maintaining a plurality of message types and, for each of the message types, message properties for parsing text-based data communicated by the message type; and wherein
the document interface is further operable to determine a message type for the original document, to access the interface database to determine the properties for identifying the subparts of the electronic data in the original document, and to use the properties indicated in the interface database to perform the parsing of the electronic data.

16. The device of claim 9, wherein the document interface is further operable to:
determine a segmentation threshold;
determine a size of the original document;
determine that the size exceeds the threshold; and perform the generation of the master document and the document segments in response to determining that the size exceeds the threshold.

17. Logic for parsing data for delivery to a remote device, the logic encoded in computer readable media and operable when executed to perform the steps of:
    identifying an original markup language document comprising text-based electronic data for delivery to a destination address, the electronic data having a plurality of subparts identifiable based upon properties of the electronic data;
    parsing the data into the subparts;
    generating a master markup language document comprising a master identifier, an indication of the number of the subparts, and the destination address;
    generating, for each of the subparts, a markup language document segment comprising a segment identifier, the master identifier, a sequence number, and the subpart; and
    transmitting the master document and each of the document segments using a communication network.

18. The logic of claim 17, further operable when executed to perform the steps of:
    receiving a second master document comprising a second master document identifier;
    receiving a plurality of second document segments each comprising a segment identifier, the second master identifier, a sequence number, and a subpart of second text-based electronic data;
    associating the second master document and the second document segments using the second master identifier;
    determining that all expected ones of the second document segments have been received; and
    assembling a second original document from the subparts contained in the second document segments.

19. The logic of claim 18, further operable when executed to perform the steps of:
    determining a destination application based on the destination address indicated in the original document; and
    delivering the original document to the destination application.

20. The logic of claim 17, wherein the original document further comprises a binary file attachment, and wherein the further operable when executed to perform the steps of identifying the binary file attachment and attaching the binary file attachment to a selected one of the master document, one of the document segments, or an additional document segment.

21. The logic of claim 17, wherein the master document and all of the document segments conform to a public standard for text-based, markup language communications.

22. The logic of claim 21, wherein the standard is an extensible mark-up language (XML) standard.

23. The logic of claim 17, further operable when executed to perform the steps of:
    determining a message type for the original document;
    accessing an interface database specifying, for the message type, the properties for identifying the subparts of the electronic data in the original document; and
    using the properties indicated in the interface database to perform the parsing of the electronic data.

24. The logic of claim 17, further operable when executed to perform the steps of:
    determining a segmentation threshold;
    determining a size of the original document;
    determining that the size exceeds the threshold; and
    performing the generation of the master document and the document segments in response to determining that the size exceeds the threshold.

25. A device for parsing data for delivery to a remote device comprising:
    means for identifying an original markup language document comprising text-based electronic data for delivery to a destination address, the electronic data having a plurality of subparts identifiable based upon properties of the electronic data;
    means for parsing the data into the subparts;
    means for generating a master markup language document comprising a master identifier, an indication of the number of the subparts, and the destination address;
    means for generating, for each of the subparts, a markup language document segment comprising a segment identifier, the master identifier, a sequence number, and the subpart; and
    means for transmitting the master document and each of the document segments using a communication network.

* * * * *